Figure 1:
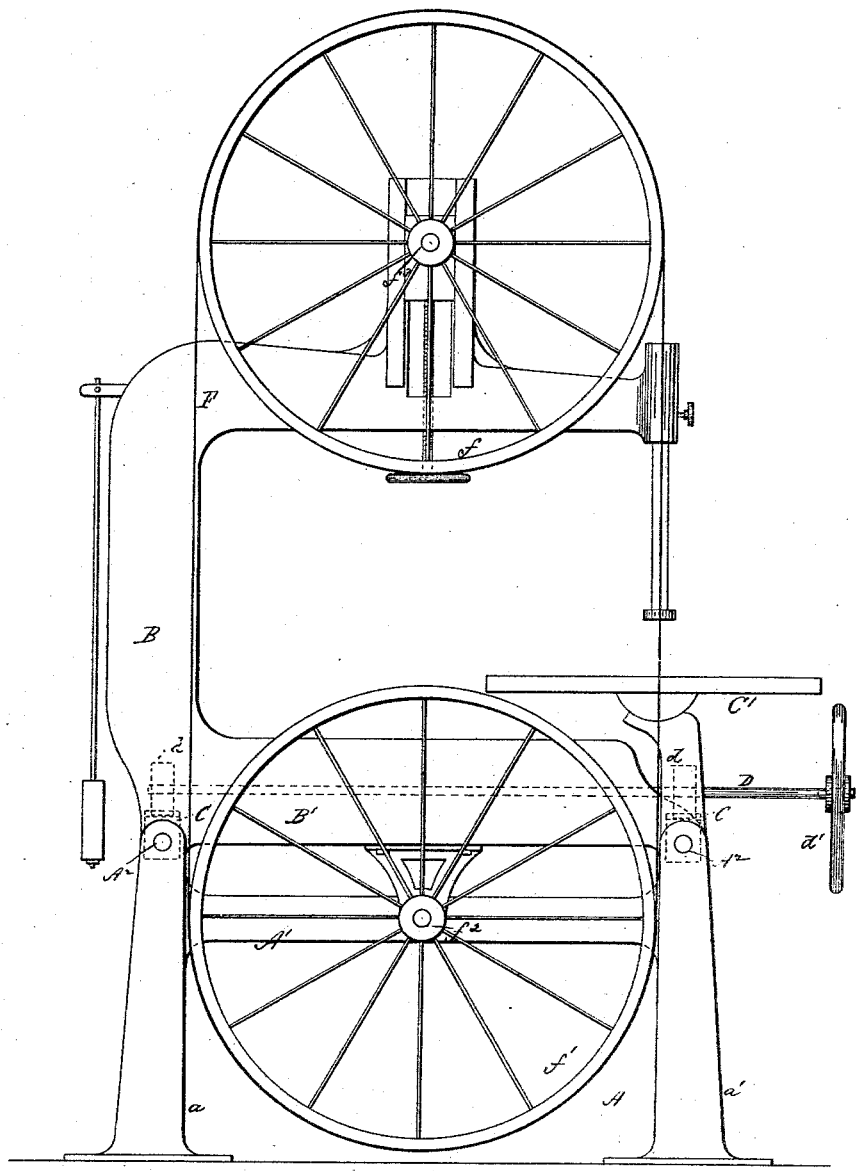

(No Model.)

L. T. PYOTT.
BAND SAW MILL.

2 Sheets—Sheet 1.

No. 325,629. Patented Sept. 1, 1885.

WITNESSES:

INVENTOR

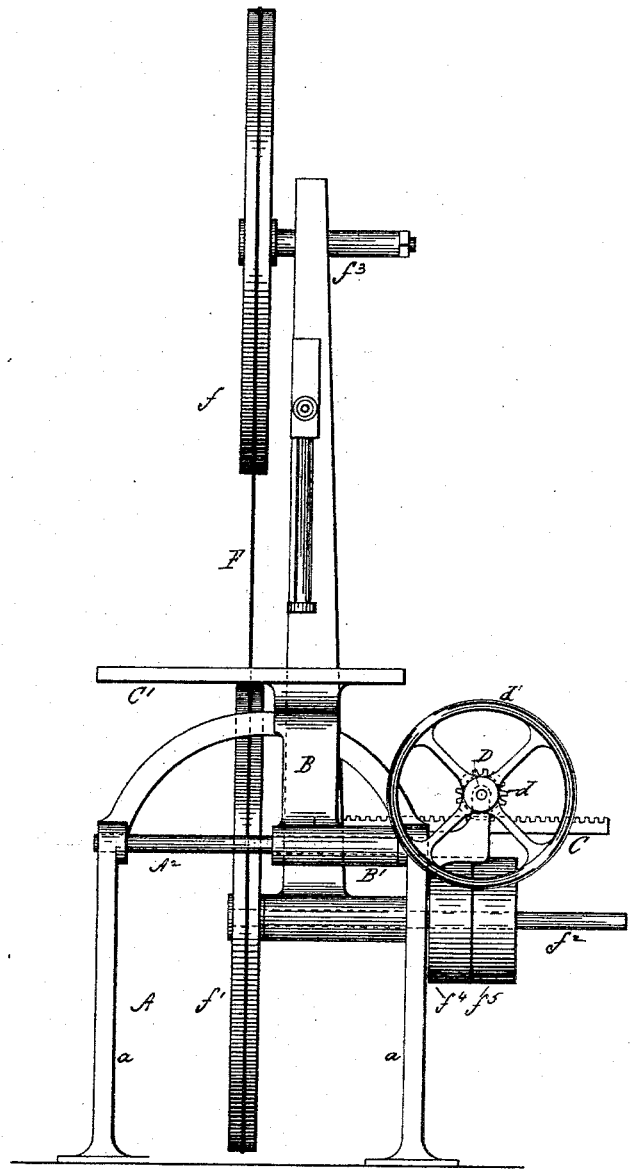

UNITED STATES PATENT OFFICE.

LOUIS T. PYOTT, OF PHILADELPHIA, PENNSYLVANIA.

BAND-SAW MILL.

SPECIFICATION forming part of Letters Patent No. 325,629, dated September 1, 1885.

Application filed January 20, 1885. (No model.)

*To all whom it may concern:*

Be it known that I, LOUIS T. PYOTT, a citizen of the United States, residing at Philadelphia, in the county of Philadelphia and State of Pennsylvania, have invented certain new and useful Improvements in Band-Saw Machines; and I do hereby declare the following to be a full, clear, and exact description of the invention, reference being had to the accompanying drawings, which form part of this specification, in which—

Figure 1 is a side elevation, and Fig. 2 a front elevation, of a machine embodying my improvements.

My invention has for its object to provide a construction of band-saws, whereby the blade, with its rotary or driving device, may be caused to move forwardly to perform its work in cases where it will be found more convenient so to move it than to feed the material, as heretofore, against the blade.

My invention consists, broadly, of a band-saw machine constructed so that the blade may be moved against the work to follow up its cut.

My invention still further consists in the peculiar construction of the machine, as hereinafter specifically described and claimed, whereby the saw, with its rotary or drawing device, may be caused to traverse or move laterally to advance it upon the work, substantially as hereinafter fully described.

Referring to the accompanying drawings, A indicates the lower portion or base of the frame, which is designed and intended to be stationary, and B is the upper frame, which is movable upon the lower part or base, A. The lower frame or base, A, comprises the front and the rear standards, $a$ $a'$, connected, as shown, by the side bars, A' A'. These standards afford supports for two rods or rails, $A^2$ $A^2$, on which the lower part, B', of the upper frame, B, is sustained, and on which said frame B may move from side to side of the machine, or with a traversing motion.

To communicate such motion to the frame B its lower part, B', is provided with rigidly-secured racks C C, which project laterally, as shown, and are in gear with pinions $d$ $d$ on a shaft, D, having bearings on the upper portion of the base A, and provided with a hand-wheel, $d'$. By turning this hand-wheel the frame B may be caused to move laterally, thus advancing the saw-blade F, which runs over the pulleys $f f'$, against or upon its work, and rendering it unnecessary to move such work, as heretofore, against the blade in cases where it would be inconvenient so to do. Said pulleys $f f'$ constitute the rotary or driving devices for the saw-blade, and as their shafts $f^2 f^3$ have their bearings in the frame B they move with the latter. The belt which drives the shaft $f^2$ runs upon the pulleys $f^4 f^5$, one of which is fast and the other loose, and said shaft is splined, so that it can move longitudinally through said pulleys to partake of the lateral motion of the frame B, the position of the pulleys $f^4 f^5$ remaining unaffected by the movement of the shaft.

The advantage of my invention is that the blade can be moved against the work and the latter remain stationary, which will be found a benefit in many cases when it would not be convenient to move heavy timbers. By means of my invention a band-saw may be advantageously and economically employed as a substitute for a circular saw in many classes of work.

The table C' remains stationary, and the upper frame need not necessarily be caused to traverse, as, if desired, the work may be fed, as usual, to the blade, the latter not then being moved, though remaining capable of movement when desired.

What I claim as my invention is as follows:

1. A band-saw machine in which the frame is composed of two parts, the upper part being laterally movable on the lower part or base, and carrying the blade and its driving mechanism, said blade being arranged to travel and cut in a vertical plane, substantially as shown and described.

2. In a band-saw machine, the combination of the base A, having rods or rails $A^2$, with the movable frame B, sustained on said rails and laterally movable thereon, and a saw or blade moving and cutting in a vertical plane, substantially as shown and described.

3. In a band-saw machine having a stationary base and a movable upper frame carrying the blade and its driving or rotary devices, the combination of the shaft D, with pinions $d$ $d$ and hand-wheel $d'$, supported on said base, with the racks C C, secured to said movable frame B, and engaging with said pinions, substantially as shown and described.

4. In a band-saw machine having a laterally-movable upper frame, B, supported upon a lower frame, A, and carrying the band-saw or blade and the pulleys $f f'$, the combination therewith of the shaft $f^2$, having fast and loose pulleys $f^4 f^5$, said shaft being splined in said pulleys, whereby it may be moved in unison with the upper frame of the machine without affecting the position of its belt-pulleys, substantially as shown and described.

In testimony that I claim the foregoing I have hereunto set my hand this 8th day of January, 1885.

LOUIS T. PYOTT.

Witnesses:
LISLE STOKES,
M. D. CONNOLLY.